Sept. 21, 1948.  W. VAN B. ROBERTS  2,449,621
COMPARISON OF RADIO FREQUENCY CIRCUIT LOSSES
Filed Sept. 30, 1942
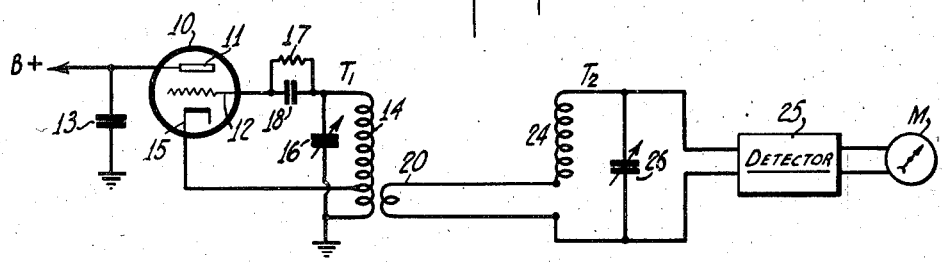
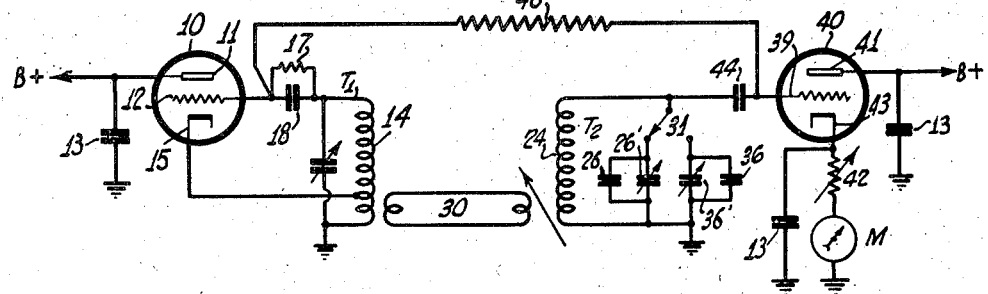
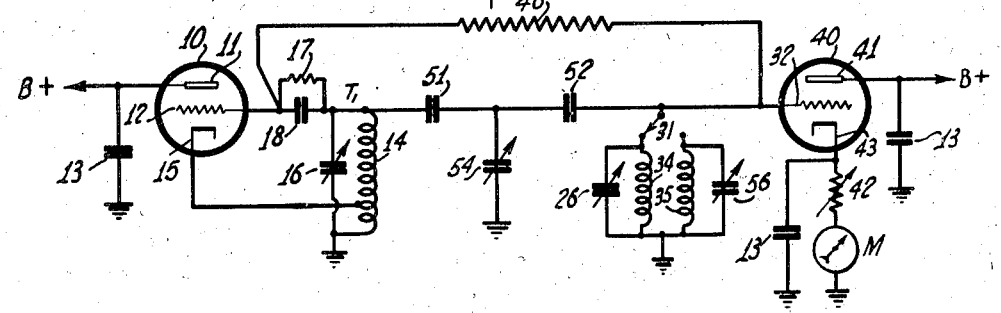
INVENTOR
WALTER VAN B. ROBERTS.
BY H.S. Grover
ATTORNEY Patented Sept. 21, 1948

2,449,621

UNITED STATES PATENT OFFICE 2,449,621

COMPARISON OF RADIO FREQUENCY CIRCUIT LOSSES

Walter van B. Roberts, Princeton, N. J., assignor to Radio Corporation of America, a corporation of Delaware Application September 30, 1942, Serial No. 460,203

9 Claims. (Cl. 175—183)

The present invention relates to radio frequency measurements and, more particularly, to a method of and means for determining the relative factor of merit of condensers or inductances.

An object of the present invention is the provision of a novel method of comparing the quality of condensers or inductances.

Another object of the present invention is the provision of a novel method of comparing radio frequency losses in dielectrics.

Still another object of the present invention is the provision of means for comparing the quality of condensers or inductances.

A further object of the present invention is the provision of means for comparing losses in high frequency tuned circuits or in the component parts thereof.

Another object of the present invention is the provision of sensitive rugged means for comparing losses in high frequency tuned circuits or in the component parts thereof.

An extremely important property of a capacitance or an inductance is its factor of merit, more generally called its "Q." It is this factor which determines the sharpness of resonance of a tuned circuit. This factor of merit or "Q" may be expressed by the equation $$Q \cong \frac{X}{R}$$

where R is the radio frequency resistance and X is the reactance of the element under consideration. An increase of resistance, it will be noted, causes a broadening out and lowering of the peak of the resonance curve. Since the voltage amplitude developed across a circuit at resonance per unit voltage applied therein is numerically equal to the factor of merit or "Q" of the circuit a convenient way of measuring the factor of merit is to apply a small voltage of resonant frequency to the circuit, and then to detect and measure the stepped up voltage developed thereacross. The ratio of the developed voltage to the impressed voltage is then the factor of merit or "Q" of the circuit. However, without utilizing very sensitive meters having arrangements associated therewith for balancing out the idle current of the detector, this arrangement is not capable of detecting small differences between circuits having nearly equal factors of merit.

In accordance with the principles of the present invention, therefore, it is proposed to utilize an infinite impedance detector across the tuned circuit which is to have its factor of merit determined. The detector has, furthermore, an additional bias applied to its grid from the grid leak of the oscillator supplying radio frequency to the tuned circuit. This bias prevents current flow through the detector until the voltage developed across the circuit exceeds a predetermined value. Thus no balancing current is needed in connection with the meter. Therefore, there is no danger of overloading the meter from the balancing current alone. Furthermore, if the oscillator should fail and thus not supply an additional bias to the detector, the cathode resistance of the infinite impedance detector limits the current to a safe value since, under these circumstances, there is no radio frequency voltage impressed on the detector. These arrangements also have the advantage that power supply variations cause corresponding variation in both the radio frequency voltage and said additional bias, so that the ratio of those is little affected.

The novel features which, it is believed, are characteristic of the present invention are pointed out with particularity in the appended claims. However, the invention will be more completely understood by reference to the following detailed description which is accompanied by a drawing in which Figure 1 illustrates a somewhat conventional means for determining the factor of merit of a circuit, while Figure 2 illustrates the application of the principles of the present invention to the circuit of Figure 1, and Figure 3 illustrates a modification of the embodiment shown in Figure 2.

In Figure 1 is shown a radio frequency oscillator including a thermionic discharge tube 10 having its anode 11 connected to a source of anode supply, as indicated by the arrow labeled B+. The grid 12 is connected to one end of inductance 14 of tank circuit $T_1$, the other end of the inductance being grounded. In order to generate oscillations, cathode 15 of the tube 10 is connected to a tap on the coil 14 of tank circuit $T_1$. The tank circuit is tuned to the desired operating frequency by means of variable condenser 16. A grid leak 17 and a grid condenser 18 are connected in circuit between grid 12 and coil 14 in a manner well known in the art. A second resonant circuit $T_2$ having a coil 24 and a variable tuning condenser 26 is inductively coupled to the tank circuit $T_1$ by means of coupling link 20. Thus a small radio frequency voltage developed by the oscillator in the tank circuit $T_1$ may be applied to the tank circuit $T_2$. The radio frequency voltage developed across tank circuit $T_2$ is measured by means of detector 25 and output meter M. Assuming that the output meter indicates the actual radio frequency voltage across $T_2$, and that the applied voltage is known, the factor of merit or "Q" of the circuit is the ratio of the output voltage to the voltage impressed on the circuit from the oscillator. As before mentioned, such an arrangement may be satisfactory for the actual measurement of the "Q" of a circuit but it is not sufficiently sensitive to small changes therein for precise comparison of two circuits having very nearly equal values of "Q." The arrangement may be made more precise by utilizing a more sensitive meter at M if a balancing circuit arrangement is provided so that only the change in the developed voltage is indicated by the meter M. However, such balancing current requires careful adjustments and if not properly manipulated may burn out the sensitive meter.

In the arrangement of Figure 2 is shown a modification of the circuit shown in Figure 1 wherein the disadvantages of circuit in Figure 1 are overcome. A very sensitive meter may be employed without endangering the meter through careless adjustment of any balancing current. The oscillator circuit of Figure 2, by means of which a radio frequency voltage is developed in tank circuit $T_1$, is the same as that shown in Figure 1 and will not be again separately described. The radio frequency voltage developed in tank circuit $T_1$ is induced into tank circuit $T_2$ by means of an adjustable link circuit 30. Tank circuit $T_2$ of Figure 2 is provided with a first capacity 26 and an associated adjustable trimmer condenser 26', a second capacity 36 and an associated trimmer condenser 36', either of which combinations may be selectively inserted into the circuit by means of switch 31. The radio frequency voltage developed across tank circuit $T_2$ is impressed on grid 39 of a detector tube 40 which is somewhat similar to the so-called infinite impedance detector, already known in the art, in that the anode 41 is directly connected to a source of anode potential, as indicated by the arrow labeled B+, while the load circuit, including meter M and adjustable resistance 42, is connected in series between cathode 43 and ground. By-pass condensers 13 may be provided from the anodes of tubes 10 and 40 to ground and from the cathode 43 of tube 40 to ground in a conventional manner. The grid 39 of detector tube 40 is isolated from ground by blocking condenser 44 and the grid is supplied with a bias developed across the oscillator grid leak 17 by way of the very high resistance 46. This resistor may be connected to an intermediate point on grid resistance 17 if it is desired to employ looser couplings at link 30.

It will be seen that unless the voltage developed across tank $T_2$ reaches a certain magnitude the large bias on grid 39 assures that no current will flow through the sensitive meter M so that no balancing current is required in connection with the meter. There is, therefore, no danger of the meter being overloaded by the balancing current itself. Furthermore, as a result of self bias provided by resistor 42 and/or by the resistance of the meter itself, if the oscillator should fail to oscillate and thus fail to provide any grid bias for the detector tube 40, the current through the meter is limited by said self biasing effect to a small safe value.

In utilizing the circuit of Figure 2 for comparing losses in dielectric samples, the condensers 25 and 36 may be so arranged that samples may be inserted between their electrodes. The procedure is as follows: With one of the samples inserted between the plates of condenser 26, and with this sample switched into the circuit by means of switch 31, the trimmer condenser 26' and the coupling of the link circuit 30 are so adjusted that the resonant voltage across tank circuit $T_2$ produces a relatively large deflection of meter M, for example, ½ or ¾ of its full scale. Without altering the link coupling 30, switch 31 is then switched to its other position thus connecting condenser 36 across 34. Condenser 36 may have another dielectric sample between its plates. Trimmer condenser 36' is then adjusted for resonance. The switch 31 may then be thrown back and forth to assure that the change in meter reading is the same each time the switch is operated. The change in meter reading indicates the difference between the circuit "Q" with one sample in place and the circuit "Q" with the other sample in place. If desired, of course, one of the condensers 26 or 36 may be left empty, in which case the comparison is between a given sample and an equivalent volume of air dielectric. It is assumed, of course, that the condensers 26 and 36 and their associated trimmer condensers 26' and 36' are physically similar and symmetrically arranged so that there is no difference in meter reading when there is no dielectric in either of the holders.

Due to the sensitivity of the circuit arrangement described, if there is any great difference in the dielectric quality of the samples placed between the plates of condensers 26 and 36, the meter M may go off scale in one position of switch 31 and fail to be deflected at all in the other position of switch 31. In this case, the sensitivity of the instrument may be reduced by cutting in more resistance by means of variable resistance 42 thus, in effect, reducing the change in meter reading between the two positions of switch 31.

If it is desired to compare the factor of merit of two coils the arrangement of Figure 3 may be used. The arrangement of the oscillator circuit is identical with that of Figures 1 and 2 and the arrangement of the detector tube 40 is the same as Figure 2. They will, therefore, not be again described.

However, in this case switch 31 is arranged to selectively connect into the circuit coils 34 and 35. Coils 34 and 35 are arranged to be tuned to the frequency generated by the oscillator tube 10 by means of variable condensers 26 and 56. Furthermore, instead of link coupling 30, a capacity coupling arrangement is provided which utilizes two extremely small condensers 51 and 52 connected in series between the high voltage ends of the two resonant circuits, together with a relatively large variable capacity 54 connected between the junction of the two small capacities and ground. The serially connected small capacities 51 and 52 are so chosen as to give somewhat more than ample coupling in the absence of the variable capacity 54. The maximum value of condenser 54 is sufficiently large to reduce the effective coupling between tank circuit $T_1$ and the tank circuits connected to the detector circuit to as small a value as required.

It will be noted that the grid bias supply through resistor 46 plays the part of a bucking out current for the meter in that the meter measures only the excess of voltage above a certain value while the infinite impedance type of detector circuit safeguards the meter against failure of the bias derived from the oscillator. Since the bias derived from the oscillator is proportional to the voltage developed by the oscillator, it has been found in experimental use of the arrangement of Figure 2 that the system may be operated without substantial change of any of its adjustments over a wide range of plate voltages where both plates 11 and 41 are energized from the same voltage and source, the only difference noted being increased sensitivity in the case of higher plate voltage.

In the above mentioned experimental arrangement a satisfactory value of resistor 46 was found to be of the order of 5 to 10 megohms, when the oscillator grid leak had a value of about 50,000 ohms, the plate voltage being anything from 45 to 90 volts. The meter M, having an internal resistance of 10,000 ohms, gave a full scale deflection for 400 microamperes, while variable resistor 42 had a maximum value of 50,000 ohms. In the experimental arrangement the trimmer condensers 26' and 36' of Figure 2 were made as small as possible while still resonating the tank circuit $T_2$ with the dielectric sample in place and the oscillator frequency was adjusted to bring this about. The tank circuit coils used were of a type manufactured for use in a 75 meter amateur band transmitter.

As pointed out previously, the present invention has its chief usefulness in comparing losses in nearly equal circuit components. However, an actual measurement of the "Q" of a circuit may be made by calibrating the arrangement suitably. For example, if a tuned circuit of known "Q" is substituted for condenser 26' and coil 34 and if condenser 54 is then adjusted so that at resonance the meter M shows some arbitrary small deflection, then this known "Q" value may be marked on the dial of condenser 54. In similar fashion other calibration points may be marked on this dial. With the dial so calibrated, the "Q" of other circuits of similar reactance may be read from the dial when it is adjusted to produce the aforesaid resonance indication at M and the system is otherwise operated under the same conditions as prevailed during calibration.

While I have illustrated several modifications of the present invention and given certain specific values for the circuit components used it should be clearly understood that the present invention is not limited thereto since many modifications may be made in the several elements employed in their arrangement and it is, therefore, contemplated by the appended claims to cover any such modifications as fall within the sphere and scope of the present invention.

I claim:

1. In a system for comparing circuit losses, means for generating a radio frequency voltage, means for applying a predetermined amount of said voltage to a tuned circuit including an inductance and a plurality of condensers adapted to be selectively connected across said inductance, said condensers having different dielectric materials between their electrodes, means for so adjusting each of said condensers that they each tune said inductance to the frequency of said generating means, a thermionic discharge tube having an anode, cathode and grid, means for connecting the positive terminal of a source of anode potential to said anode, the negative terminal of said source being connected to a point of reference potential, a connection from said cathode to said point of reference potential, said connection including a current responsive instrument, means for coupling said grid to one end of said tuned circuit, the other end being connected to said point of zero reference potential, said means for generating radio frequency voltage being characterized in that in operation a negative potential with respect to said reference point is developed and means for applying a predetermined portion of said negative potential to the grid of said tube.

2. In combination, a thermionic discharge tube oscillator circuit including a tuned circuit and a grid leak, a second tuned circuit, a link circuit coupling said tuned circuits, a second thermionic discharge tube having a control electrode coupled to said second tuned circuit, an anode and a cathode, an anode-cathode circuit and a control electrode-cathode circuit connected thereto, a portion of said circuits being common, a current measuring instrument in the common portion of said circuits, said control electrode-cathode circuit including a high resistance connection from said control grid to said grid leak, means for selectively connecting a number of condensers in said second tuned circuit, said condensers each being adapted to include a different dielectric between electrodes thereof.

3. Means for comparing circuit losses in a number of resonant circuits including means for introducing selectively into said circuits a radio frequency voltage of the frequency to which said circuits are resonant, means for deriving a direct potential proportional to said radio frequency voltages, means for rectifying solely the voltage developed across said circuits which exceeds in amplitude the amplitude of said direct potential and means for determining the magnitude of said rectified voltages.

4. In combination a radio frequency oscillator circuit including a resistance across which a direct potential is developed of an amplitude proportional to the amplitude of oscillations generated by said circuit, a detector circuit having a control electrode circuit and an output circuit, means for applying said direct potential to said control electrode circuit, a current measuring instrument in said output circuit, a resonant circuit adapted to be tuned to the frequency of oscillations generated by said oscillator circuit, means for coupling said resonant circuit to said oscillator circuit and means for coupling said control electrode circuit to said resonant circuit.

5. In a system for comparing circuit losses, means for generating a radio frequency voltage, means for applying predetermined amount of said voltage to a tuned circuit including an inductance and a plurality of condensers adapted to be selectively connected across said inductance, said condensers having different dielectric materials between their electrodes, means for so adjusting each of said condensers that they each tune said inductance to the frequency of said generating means, control electrode, anode and cathode connections for a thermionic tube, means for connecting a terminal of a source of anode potential to said anode connection, another terminal of said source being connected to a point of zero reference potential, a current responsive instrument connected in series between said cathode connection and said point of zero reference potential, means for connecting said grid connection to one end of said tuned circuit, the other end of said tuned circuit being connected to said point of said zero reference potential, means for developing a negative potential having an amplitude proportional to the amplitude of the voltage generated by said radio frequency generating means and means for applying a portion of said negative potential to said grid connection.

6. In combination a thermionic discharge tube oscillator circuit including a tuned circuit and a grid leak, a second tuned circuit, a circuit coupling said tuned circuits, a second thermionic discharge tube having a control electrode coupled to said second tuned circuit, an anode and a cathode, an anode-cathode circuit and a control electrode-cathode circuit connected thereto, a portion of said circuits being common, a current measuring instrument in the common portion of said circuits, said control electrode-cathode circuit including a high resistance connection from said control grid to said grid leak, said second tuned circuit including parallel connected inductance and capacitance elements and means for selectively substituting said elements of said second tuned circuit.

7. In combination a thermionic discharge tube oscillator circuit including a tuned circuit and a grid leak, a second tuned circuit, a circuit coupling said circuits, means for coupling a control grid circuit of a second thermionic discharge tube having an anode-cathode path and a control grid to said second tuned circuit, a current measuring instrument connected in series with said anode-cathode path, a high resistance connection from said control grid to said grid leak and means for selectively substituting different reactance elements in said second tuned circuit.

8. In combination a radio frequency oscillator circuit including a resistance across which a direct potential is developed of an amplitude proportional to the amplitude of oscillations generated by said circuit, a detector circuit having a control electrode circuit and an output circuit, means for applying said direct potential to said control electrode circuit, a current measuring instrument in said output circuit, a resonant circuit adapted to be tuned to the frequency of oscillations generated by said oscillator circuit, means for coupling said resonant circuit to said oscillator circuit and means for coupling said control electrode circuit to said resonant circuit, said resonant circuit including parallel connected inductance and capacitance elements and means for selectively substituting elements in said resonant circuit.

9. In combination a radio frequency oscillator circuit including a resistance across which a direct potential is developed of an amplitude proportional to the amplitude of oscillations generated by said circuit, a detector circuit having a control electrode circuit and an output circuit, means for applying said direct potential to said control electrode circuit, a current measuring instrument in said output circuit, a resonant circuit adapted to be tuned to the frequency of oscillations generated by said oscillator circuit, means for coupling said resonant circuit to said oscillator circuit and means for coupling said control electrode circuit to said resonant circuit, and means for selectively substituting other similar resonant circuits for said first mentioned resonant circuit.

WALTER van B. ROBERTS.

REFERENCES CITED

The following references are of record in the file of this patent:

UNITED STATES PATENTS

| Number | Name | Date |
| --- | --- | --- |
| 2,077,357 | Doolittle | Apr. 13, 1937 |
| 2,111,235 | Avins | Mar. 15, 1938 |
| 2,135,017 | Sharland | Nov. 1, 1938 |
| 2,137,787 | Snow | Nov. 22, 1938 |
| 2,146,073 | Jennens et al. | Feb. 7, 1939 |
| 2,153,780 | Van Loon | Apr. 11, 1939 |
| 2,252,058 | Bond | Aug. 12, 1941 |
| 2,319,475 | Quayle | May 18, 1943 |
| 2,320,175 | Dennis et al. | May 25, 1943 |
| 2,337,759 | Loughlin | Dec. 28, 1943 |